(12) United States Patent
Zhilkov

(10) Patent No.: US 6,924,920 B2
(45) Date of Patent: Aug. 2, 2005

(54) METHOD OF MODULATION AND ELECTRON MODULATOR FOR OPTICAL COMMUNICATION AND DATA TRANSMISSION

(76) Inventor: Stanislav Zhilkov, 12030 Bustleton Ave., Apt. #2, Philadelphia, PA (US) 19118

( * ) Notice: Subject to any disclaimer, the term of this patent is extended or adjusted under 35 U.S.C. 154(b) by 0 days.

(21) Appl. No.: 10/447,869

(22) Filed: May 29, 2003

(65) Prior Publication Data

US 2004/0240035 A1 Dec. 2, 2004

(51) Int. Cl.$^7$ .......................... G02B 26/00; G02B 6/34; H01S 3/00
(52) U.S. Cl. .......................... 359/293; 359/335; 385/37
(58) Field of Search ................................ 315/506, 507; 359/293, 335; 372/74; 385/2, 37; 398/183

(56) References Cited

U.S. PATENT DOCUMENTS

| | | | |
|---|---|---|---|
| 4,298,824 A | * 11/1981 | Walsh | 315/4 |
| 5,263,043 A | * 11/1993 | Walsh | 372/102 |
| 5,268,693 A | * 12/1993 | Walsh | 372/74 |
| 5,790,585 A | * 8/1998 | Walsh | 372/102 |
| 6,195,199 B1 | * 2/2001 | Yamada | 359/333 |
| 6,301,041 B1 | * 10/2001 | Yamada | 359/333 |

* cited by examiner

Primary Examiner—David N. Spector
(74) Attorney, Agent, or Firm—Albert T. Keyack

(57) ABSTRACT

The present invention provides a method for modulating light by a driven particle beam is disclosed. An optical beam is being sent to metal-dielectric structure so that the optical field partially transforms into a delayed electromagnetic wave, in a preferred embodiment into the surface evanescent mode, and the beam of charged particles, such as electrons, is also sent to said structure the way that the particle's kinetic energy partially transforms into energy of the delayed electromagnetic wave having the same phase-frequency characteristics as transformed field of optical beam at that, transformation of the optical beam and excitation of wave by particle beam commonly take place at the same small space region, which is localized by said metal-dielectric structure. Delayed electromagnetic wave, which is generated by particle beam, is summarized with the optical field, which is transformed on said structure. Therefore, the particle beam influences on intensity of optical beam observed after passing the region of localized transformation. The controlled changing of parameters of particle beam in interaction region leads to adequate changing of intensity of the optical beam passed through said region and this way the predetermined modulation realizes.

2 Claims, 1 Drawing Sheet

METHOD OF MODULATION AND ELECTRON MODULATOR FOR OPTICAL COMMUNICATION AND DATA TRANSMISSION

BACKGROUND OF THE INVENTION

1. Field of the Invention

The present invention provides methods of modulating in optical communication, said methods comprising means for accelerating charged particles so as to establish positive net emission of electromagnetic radiation, said method comprising means for driving accelerated particles, as well as comprising means for transforming an optical beam into a delayed electromagnetic wave, and also converting the kinetic energy of charged particles into energy of the same electromagnetic wave. The steps of transforming as well as converting take place simultaneously in the same interaction region, which is formed by a wave-guide structure. The step of transforming may be implemented e.g., as said wave guide structure having suitable geometric configuration and dielectric/metal properties. Said manipulating means may be implemented, e.g., as deflector, which is driven by a small voltage, alternatively, other systems for changing of charged particle beam properties can be exploited for said manipulating.

Prior art optical techniques for modulating signals may take the form of a mechanical shutter, which is interposed between areas of light transmission or directly on surface of light-guide fiber. These shutters tend to have natural limit for velocity determined by mechanical part motion. The best "push-pull" configuration modulator, which has magnitude ~1.5 microns, operates with voltage ~2 volts and at a frequency of ~40 GHz. Another technique includes the use of a semiconductor optical guide, across which electrical voltage or magnetic field may be applied. This voltage (or field) alters the optical characteristics of such guide to change or modulate the light passing therethrough. This provides a workable optical device and its speed of modulation is limited by inertia of electrical properties of solid state. The best example of characteristics-changing semiconductor devices can be efficient in transmitting data at rates of speed ~160 Gbits per each carrying frequency channel before wavelength division multiplexing. Other types of solid-state devices use acousto-optical waves or surface plasmon and don't have better rates of speed than previous example. Apparently, modulation by direct superposition of modulating light and propagating light will have higher rates of speed, then in case of using of solid-state electro-inertial devices. Initially it had been proposed that the modulating mode should be added to other modes into multimode light-guide fiber. But in that type of modulation the use of multimode fiber was obligatory and there were nothing said about the technique of producing high-speed changed modulating light. Later it has been suggested, that low-power diode laser, which modulated an output power of fiber laser, could be used. However, the necessary semiconductor diode has the same modulating speed limitation as other solid-state devices. At the present, therefore, new knowledge shows that sophisticated multimode regime is not obligatory and, exactly, driven radiation of free moving charged particles should be used to produce modulating light for the fastest modulation process in optical data transmitting.

2. Background of the Related Art

Over-Light Speed Effects (OLSE)

OLSE, such as Cherenkov effect (CR) and Smith-Purcell effect (SPR), exist in charged particle radiation, when velocity of particle moving is higher then speed, with which the front of electromagnetic wave is transferred (higher than phase speed of light). Also OLSE-radiation emits by charged particles passing suddenly between two media with different indices of refraction, e.g., a thin foil and vacuum (transmitting radiation TR). Diffraction radiation (DR) is similar to TR except the particles pass through a small aperture. CR, SPR, DR and/or TR as jointly (in combinations) as well severally can be exploited for producing of modulating light.

In particular, CR and/or SPR take place for charges, which compactly move along a surface and their velocity is more than speed of electromagnetic surface wave (ESW, or evanescent mode). Efficiency of transformation of moving particle power into ESW-power is determined by the boundary parameters. Transformation parameters were studied for both periodical metal structures and periodical dielectric structures; moreover, it is well known that transformation is possible even in the case of a flat dielectric surface—the case of total internal reflection. OLSE-power application has been used for decades in diffraction electronics as a microwave amplifier and now is being developed up to X-ray generation in Free Electron Laser (FEL) schemas. Previously, inverse OLSE-power application was exploited and developed for acceleration of charged particles by light and infrared lasers. And lastly the first device "electron tube type unidirectional optical amplifier" was recently patented; conditions of the energy exchange between electron beam and light beam in this device are similar as in other CR or SPR devices.

So, great amount of works is concerned about OLSE for power application, and new technique becomes to fit for OLSE information application, or for optical modulation purposes exactly.

Free Electron Lasers (FEL)

There are many schemas of FEL in use, from sub-millimeter to submicron wavelength ranges. For optical modulating purpose, the schema of FEL, which utilizes a metal grating, has been analyzed below.

Laser Accelerators (LAC)

Some schemas of LAC were proposed in recent years, including laser linac (line accelerator) with metal grating, laser-driven droplets linac, laser linac with flat or ribbed dielectric surface, and other types of LAC using near-field interaction as well as TR/DR effects. The interaction of the electron beam with the laser beam was recently successfully demonstrated in inverse Cherenkov and inverse FEL acceleration principles. Experiments involving vacuum laser acceleration will have an interaction region of about 10 waves (using 10.6 micron CO2 laser). Therefore, LAC-based embodiments should be analyzed today as workable for purposes of optical modulation.

Unidirectional Optical Amplifier (UOA)

Three schemas of UOA were proposed: UOA-1 which has the electron beam travelling line, which is made of ZnSe; UOA-2 which has wave-like mirrors; and UOA-3 which has a dielectric-layer structure. In the case of UOA-1 a sufficiently high accelerating voltage could not be used, but the delay waveguide has to be formed precisely with a precision of less than nanometer order, at present such a precise processing can't be easily realized. In the case of UOA-2 the wave-like mirrors have to be manufactured with a precision not larger than nano-meter order, at present such a technique has not been developed. Only UOA-3, which is disclosed in a patent to Yamada in 2001, discloses a currently workable design, but isn't experimentally tested yet.

Comparison of UOA, FEL and LAC for Optical Modulation

The UOA as well as the FEL are able to provide possible exponential growth for intensity of optical beam.
Yamada gave formula for UOA-3 gain coefficient "g", which can be rewritten as:

$$g=(32\pi\pi/\beta\beta)*(f*EO)*(i/I)*(l*l)/(\lambda*W*h), \quad (F1)$$

where
- "$\beta$"=v/c;
- "c" is speed of light;
- "v" is the velocity of the electron beam, which is equal to the phase speed of evanescent mode ESW;
- "h" is the dimension of electron beam in x direction (half-thickness);
- "W" is the dimension of electron beam in y direction (width);
- "l" is longitude of space in z direction, where electron beam interacts with ESW of optical beam;
- "i" is electric current of the beam;
- "I"=17 kA is the Alfven current;
- "$\lambda$" is optical wavelength in free space;
- "EO" is the coupling coefficient between optical field and electron beam, EO is obtained by averaging of quantum trace with density matrix;
- "f" is dispersion function of "quality" of electron beam. In the optimal case Yamada takes f*EQ=−0.01.

The FEL-W is disclosed in a patent to Walsh, which uses ESW over the metal grating. Kim and Song studied theory of this device; they have obtained formula for growth rate "$\mu$", which can be written as:

$$2\mu=(4\pi/\beta\beta/\gamma\gamma)*SQRT(exp2*EM)*SQRT((i/I)/(\lambda*W)) \quad (F2),$$

where
- $\gamma$—is the relativistic factor of electrons in beam;
- exp2=exp(−(4$\pi$/$\beta\gamma$)*(b/$\lambda$));
- b—is the height of passing of electron beam over the grating surface;
- EM—is the element of a refraction matrix of the metal grating, which provides the "quality" of coupling between optical field and electron beam. In the optimal case Kim takes exp2*EM=−0.1. Kim's theory is satisfactory and corresponded with experimental data.

Khizhniak and Zhilkov have patented the LAC-Z, which uses ESW over the dielectric grating in the case of total internal reflection. For this device a formula is used that is similar to (F2), but EM should be changed on ED—the element of a refraction matrix of the dielectric grating. In optional case ED can reach ~1.0, i.e., the "quality" of coupling between optical field and electron beam over the dielectric grating up to 10 times more, than over the metal grating. The following reasons explain this fact: LAC-Z uses single mode regime of field versus two modes regime in FEL-W; both CR and SPR are simultaneously used in LAC-Z versus FEL-W uses SPR only.

Comparison between UOA-3 and FEL-W is made in the numeric example, when kinetic energy of electrons is equal to 32 keV, phase velocity of ESW is equal to $\beta$=v/c=0.34 in this case. The longitude of interaction region "l" is squeezed up to accessible limit. Limit is determined by minimum as possible of diameter of a gauss optical beam and equals to tens of optical wavelengths, e.g., l=10 m$\lambda$, where m is a small integer. It is necessary for modulation to reach the growth of intensity of optical beam up to 100*a percent after passing through the interaction region; a—is a small rational number, a<1 and it's supposed to be g1)2 $\mu$l=a. If the electron beam is squeezed up to h=0.1$\lambda$ and W=100 h=10$\lambda$, and the "quality" of coupling between optical field and electron beam is optimal, then from (F1) the formula for necessary current in UOA is approximately obtained as i=0.63 a/(m*m*m) (Amps), and from (F2) the formula for necessary current in FEL is approximately obtained as i=1.78 a*a/(m*m) (Amps). As it's seen from these formulas the 13% gain (a=0.13 is enough for modulation purpose) after passing l=30$\lambda$ (e.g. m=3) will be reached, if UOA has current i=3.0 milli-Amp, or if FEL has current i=3.3 milli-Amp. So, necessary current of FEL is approximately equal to necessary current of UOA, however, at the same time the necessary current of LAC-Z is considerably less (~0.3 milli-Amp), because LAC-Z has the best "quality" of coupling between the optical field and the electron beam. The time of interaction between optical field and electron beam equals t=l/v=10 m*$\lambda$/($\beta$c)=10 m/($\beta\omega$), where $\omega$ is a frequency of field of optical beam. Consequently, the frequency of modulation of optical beam by electron beam can approximately reach:

$$\Omega=\frac{1}{2}t=\beta\omega/20m \quad (F3).$$

Formula (F3) shows, if $\beta$=0.34 and m=3, then frequency of modulation can reach hundreds of Giga-Hertz in infrared region, or Tera-Hertz for visible light, or even tens of Tera-Hertz in near ultraviolet region:

| $\lambda$ | 10.6 micron | 1.55 micron | 500 nano-meter | 8 nano-meter |
|---|---|---|---|---|
| $\Omega$ | 170 GHz | 1.1 THz | 3.4 THz | 21.25 THz |

If a relativistic electron beam is used ($\beta$=0.9) and the optical beam is the most squeezed (m=1), then the frequency of modulation (F3) is increased up to eight times compared with the previous example table. However, squeezing up to m=1 can be reached in FEL and LAC schemas, but not in UOA. In UOA interaction region "l" must include three different parts: the place of optical beam inputting (not less approximately ~10$\lambda$)), the place of optical beam outputting (not less approximately ~10$\lambda$ too), and the space between input and output of optical beam (also approximately ~10$\lambda$); at that, these parts can't be spatially combined with each other, so, in the schema of UOA "m" cannot be less than 3. At the same time both the FEL and the LAC are supposed to have an interaction region, which has all of these three parts at the same place, so, it's possible for m=1 in their schemas.

Modulating Process

In case of using ESW the interaction region has effective longitude "l" and height ~(b+h), at that, the interaction takes place exactly at the time when the optical field, which should be modulated, and the electron beam, which provides modulation, are simultaneously present at said region. Controlled modulation of the optical field is able to be reached by changing of parameters of the interacting electron beam. In particular, before the interacting process the electron beam is able to be changed by two methods at least: 1) by bunching (making discrete density) of the electron beam without changing its propagating direction; 2) by deflection of the electron beam from the interaction region and returning to said region without changing the current density.

As far as first method is concerned, today's FEL/LAC technique operates by the relativistic flat electron bunch having parameters, for example, such as h=0.5 μmicron, W=50 micron, l=30 micron, and i=100 kA; also squeezing a bunch up to h~some tens of Angstrom and l/c~some tens of atto-second was reported. Such bunching is over and above that needed for optical modulation, but the making of such a bunch is very expensive at the present time.

As for the second method, it's easy to show that a simple pair of flat electrodes is able to provide the necessary deflection/returning of electron beam by using voltage not very much than ~1V. It's well-known if the axis of electron beam is in the middle between two parallel flat electrodes when said electrodes have no voltage, then the switching on voltage "U" provides the deflection of the electron beam, at that, in beginning of the observation region said deflection is proportionally $$d \sim (U/\gamma/\beta\beta)*L1*(0.5L1+L2)/R,$$

where
L1 is length of electrode,
L2 is a distance from electrode to observation region, and
R is a distance between electrodes.

So, if the deflecting electrodes' pair is interposed before interaction region (which coincides with observation region) and, for example, β=0.34, L1=30λ R=4 h=0.4λ, L2=m2*10λ, m2 is integer, then d is approximately equal to $$d=1.25(1.5+m2)*\lambda*abs(U)/100,$$

where abs(U) is absolute value of U and U should be taken in volts.

Taking m2=7 previous formula gives d=0.1*abs(U)*λ=abs(U)*h and it shows possibility of simple manipulating of the electron beam's presence into interaction region. Said manipulating is reached by a small voltage, because if the electron beam is deflected up to some "h" superfluously over the conducting ESW surface, then interaction practically ceases. Hence, the changing of the deflecting electrodes' voltage from zero to "U" leads to modulation of optical field and said modulation has the same frequency, as frequency of voltage is changing. Also for certain embodiments of the second method, the deflector can be made as standard magneto-deflecting system, which has a small manipulating magnetic field. Flat-electrodes deflectors and the magnetic deflectors or other similar deflecting systems do not present problems in terms of modern technology and can be constructed by those of skill in the art; moreover, such deflector systems will not be expensive.

If for modulating light producing the TR/DR effects or other combination of OLSE effects are used, then the interaction region will be small as well as in the previous example, and the simple manipulation by free moving electrons is going to provide the necessary modulation process, as it shows above.

BRIEF DESCRIPTION OF THE DRAWINGS

Referring now to the drawings, FIG. 1 is a schematic diagram of a preferred embodiment of the invention. The charged particle beam 1 is typically composed, for example, of electrons. Said beam is irradiated by the accelerating system 2, directed to the manipulating system 3, and after that directed to the transforming system 4. Optical beam 5, which should preferably be modulated, is also directed to the transforming system 4. Manipulating system 3 can be of bunching type, or of deflecting type (by electric field or by magnetic field, or by combination of such fields), or, may be of another type for changing the properties of the charged particle beam. Transforming system 4 can be of UOA type, or of FEL type, or of LAC type, or of other one from the full set of OLSE-type combinations. After passing through the transforming system 4 the modulated optical beam propagates in free space up to the distant detector 6; alternatively the transforming system 4 turns into fiber optic transmitting line 7. Therefore, such a method of modulation can be exploited for both free space communication (when modulated laser beam 51 is transmitted, for example, directly to satellite receiver or retranslator) and for fiber optic communication (when modulated optical signal 52 is transmitted through a dielectric optical wave guide).

Various changes to the foregoing embodiments of the present invention would now be evident to those skilled in the art. Accordingly, the particularly disclosed scope of the invention is set forth in the following claims. In view of the invention disclosed, the idea of the manipulation of an accelerated particle beam for creation controlled light modulators is quite workable now and can be realized in many different cases. As well as it is known said idea has never been published earlier, but modulators, which are based on this idea, will provide much more speed of modulation than previous ones. Additional reasons related to the usefulness of OLSE-modulator are disclosed herein. Nuclear weapons have for five generations been the main effect consisting in electromagnetic radiation (EMR). EMR is supposed to influence semiconductor elements the way that they will change their properties and after EMR influences the devices which contain said elements, the devices will typically malfunction. At the same time devices without semiconductor elements, for example vacuum tube type, do not malfunction after EMR influence. That's why the OLSE-type modulator, which does not have any semiconductor element, has a very important positive difference from electro-absorption modulators, which are made of semiconductor material.

Figure 1:
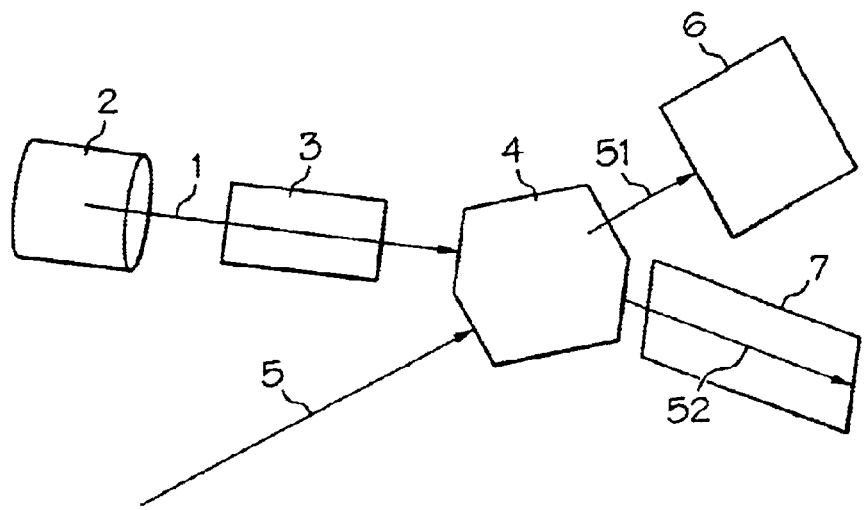
FIG. 1 is a schematic diagram of a preferred embodiment of the invention.
Figure 2:
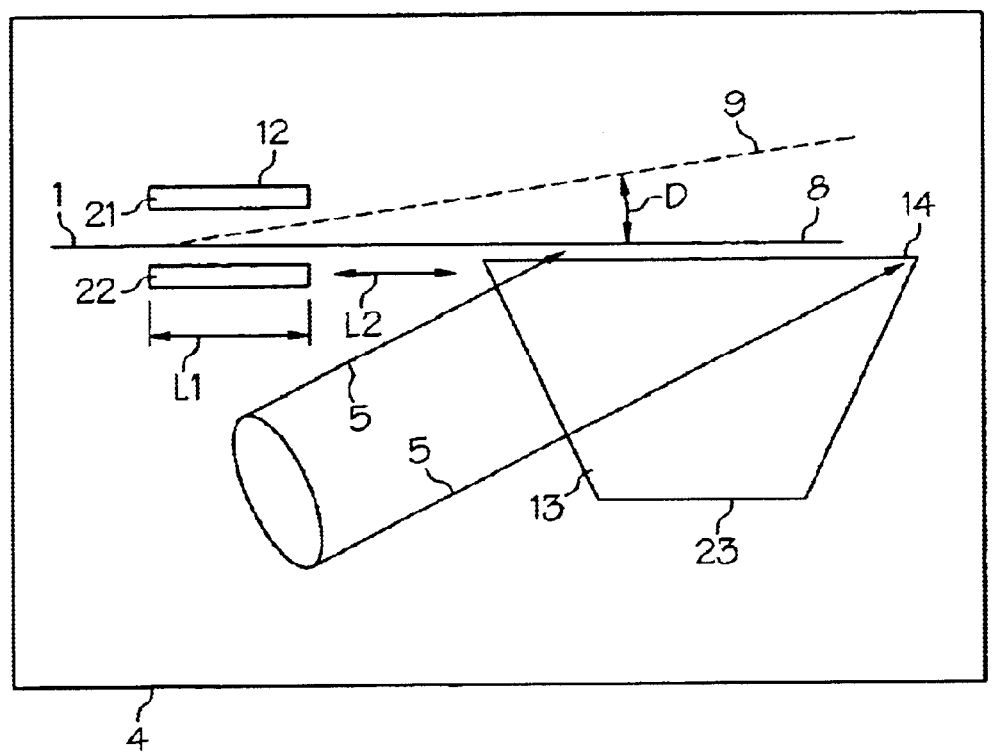
FIG. 2 is a schematic diagram of a longitudinal section of a preferred embodiment of the invention.

FIG. 2 is a schematic diagram of a longitudinal section of a preferred embodiment. The ribbon electron beam 1 (e-beam) is preliminarily accelerated up to velocity v/c=β and is directed to the manipulating element 12 which is preferably of the deflecting flat electrodes' type (deflector), which is separated by a distance L2 from the OLSE-transforming element 23 of the dielectric spatially periodical wave-guiding structure type (transformer). Deflector 12 and transformer 23 are in a vacuum vessel 4 which is also illustrated schematically and is shown with a broken away portion allowing the components discussed immediately above to be viewed.

Having elliptical midplane the optical beam 5 (o-beam) with wavelength λ is normally directed to optical input surface 13 of transformer 23; at that, o-beam's electric field is parallel to the plane of longitudinal section. Transformer 23 is made of dielectric with refractive index n and has two surfaces—plane surface 13 for o-beam inputting and periodically ribbed surface 14 having period Λ; the angle between these surfaces is equal to α. At that, for optimal functioning two obligatory conditions must take place together:

$$\lambda/\Lambda = n*\sin(\alpha) = (c/v) > 1$$

E-beam is of ribbon type having small half-thickness h and width W, for example, W=100 h, and β=0.34.

O-beam is supposed to have oval projection on the surface 14, for example, having longitude l=30λ. Deflector 20 consists of two flat parallel electrodes 21 and 22 each having longitude L1; the distance between said electrodes equals R, for example, R=4 h. The applied voltage between the deflector's electrodes can be changed from 0 to U volts. If said voltage equals 0, then the e-beam moves in the middle plane between electrodes without deflection. If said voltage equals U, then the e-beam is deflected from said middle plane and the total deflection equals d after passing through the L1-length of deflector and L2-length between deflector and transformer.

When the e-bean passes thorough the deflector element 2 without deflection (voltage equals 0), then the trajectory 8 of e-beam is parallel to the ribbed surface 14 and has a height b over said surface. When the deflector's voltage equals U, then the trajectory 9 of the e-beam has a height not less than b+d over the ribbed surface 14.

If, for example, L1=30$\lambda$ and L2=70$\lambda$, then d is approximately equal to d=abs (U)*h. Compared to non-deflecting trajectory 8, deflecting trajectory 9 of the e-beam has additional decreasing of coupling with the optical field, which is modulated, and said decreasing is in proportion to exp ($2\pi d/\lambda\beta\gamma$). So, if, for example, d equals: d=0.1$\lambda$ (i.e., U=1 volts and h=0.1$\lambda$), then in this example said coupling on—the deflecting trajectory is up to six times less than coupling on—the non-deflecting trajectory.

Ribbed surface 14, for example, has a rectangle ribs or cogs profile; the dimensions of the ribs or cogs are numerically determined to provide optimal value of the fundamental mode of a refraction matrix of said periodically ribbed surface (It is necessary for minimizing the value of current of e-beam, which is enough to provide modulation). However, even though the ribs or cogs have zero length and zero height (e.g., ribbed surface 14 is flat), then modulating effect can be reached too, but by using of considerably more value of the current of the e-beam than in the case of optimal profile. At that, the use of flat surface has important advantage—it is much more simple to go about making such a surface.

What is claimed is:

1. Apparatus for light beam modulation, said apparatus comprising:

a source of a beam of accelerated electrons up to velocity v;

a light source with wavelength $\lambda$ providing an optical beam to be modulated;

a dielectric wave-guiding structure with refractive index n having at least two surfaces:

(c) an irradiated surface for optical beam input; and (d) a transforming surface for optical field transformation into a delayed electromagnetic wave and for converting, wherein the angle between said surfaces is equal to $\alpha$ and $n*\sin(\alpha)=(c/v)>1$, whereby a beam of electrons is directed along a path extending over said transforming surface so that said beam interacts with said dielectric structure to produce interaction electromagnetic radiation as a fundamental mode of said radiation having the same phase-frequency characteristics as said delayed electromagnetic wave; and whereby the direction of the beam of electrons is manipulated to change the height of said beam over the transforming surface and to regulate energy exchange between moving electrons and said delayed electromagnetic wave so that predictable modulation is achieved for an optical field passed through said dielectric wave-guiding structure.

2. The apparatus of claim 1 wherein said dielectric wave-guiding structure transforming surface comprises a spatially periodical ribbed profile having period $\Lambda$, at that, $\lambda/\Lambda=n*\sin(\alpha)=(c/v)>1$.

* * * * *